(No Model.)

G. WOODRING.
NUT LOCK.

No. 334,836. Patented Jan. 26, 1886.

WITNESSES
A. W. Bishop.
G. P. Kramer.

INVENTOR
Gideon Woodring
By R.S. & A.P. Lacey
his Attorneys

UNITED STATES PATENT OFFICE.

GIDEON WOODRING, OF DUBOIS, PENNSYLVANIA.

NUT-LOCK.

SPECIFICATION forming part of Letters Patent No. 334,836, dated January 26, 1886.

Application filed March 2, 1885. Serial No. 157,567. (No model.)

*To all whom it may concern:*

Be it known that I, GIDEON WOODRING, a citizen of the United States, residing at Dubois, in the county of Clearfield and State of Pennsylvania, have invented certain new and useful Improvements in Nut-Locks, of which the following is a specification.

My invention relates to improvements in nut-locks, and has for its object to provide a device which will be certain in its operation, and which will be free from the objections heretofore raised against other devices for the same purpose.

It consists in the novel construction of the washer hereinafter fully described, and specifically pointed out in the claim.

Figure 1:
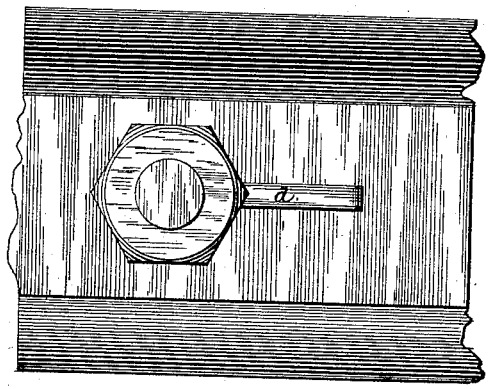
Figure 2:
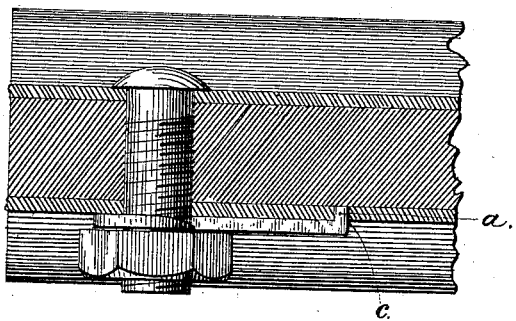
Figure 3:
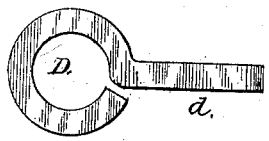
Figure 4:
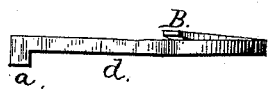

In the drawings, Figure 1 is an elevation showing my improved nut-lock in position. Fig. 2 is a horizontal longitudinal section on the line X X, Fig. 1. Figs. 3 and 4 are detail views of the washer.

My washer is constructed of a bar of metal or other suitable material, one end of which is turned outward and tapered, as shown at B. The other end, $a$, is bent at right angles to the plane of the coil. The bar is helically coiled, as will be clearly understood from the drawings, the pointed end being turned outward. The diameter of the helical coil is made equal to the diameter of the nut, the advantage of which construction will hereinafter appear. The fish-plate or other surface against which the nut is turned is provided with a notch, $c$, at some distance from the bolt-hole, in which the bent end $a$ of the washer engages. I form the washer from a bar of sufficient length to provide the arm $d$, which is formed by bending the washer at right angles to its circumference, as shown. The outer end of the arm $d$ is then bent to form the point $a$, which engages the retaining-notch.

The operation of my device will be readily understood. After the bolt has been inserted through the bolt-hole, the washer is slipped over the end of the bolt and the point $a$ fitted into the notch $c$. The nut is then placed on the bolt and turned home. The washer, by reason of being coiled helically, will not of itself lie flat against the fish-plate, and its tapered end will project outward, as shown and hereinbefore described. As the nut is turned on the bolt the coiled portion of the washer will be compressed, which will result in the pressure being applied to the nut, its tendency being to force the nut off the bolt. The action of the spring will cause the threads in the nut to bind against the threads of the bolt, and the friction between the two threads will hold the nut in place. As the nut is turned farther on the bolt the strength of the spring-washer will be increased, and consequently the friction just referred to between the two threads will be augmented. By this it will be seen that the farther on the bolt the nut is turned the greater will be the action of the spring-washer and the more securely will the parts be locked. The pressure will be equal on all parts of the nut, as the washer and nut are made of same diameter. The tapered point of the washer will bite against the under face of the nut and prevent any backward rotation of the nut, unless the same is caused by the application of a considerable degree of force. Thus it will be seen that my device efficiently prevents the loosening of the nut by jarring, &c.

Heretofore a washer has been used for locking nuts made of a flat circular plate having one end bent downward to engage a slot in the bearing-plate, and having its other end bent to act as a spring-pawl to engage notches cut in the under face of the nut. Such a washer, however, will not act when a smooth-faced nut is used, and will at no time cause the threads of the nut to bind against the threads of the bolt. A helically-coiled bar has also been used for the same purpose; but such bar has not heretofore been so constructed as to engage a retaining-notch in the fish-plate, and was liable to slip around the bolt with the nut as the same was turned home.

The disadvantages of the constructions just referred to are entirely obviated by my improvements, and a device is provided which is simple in construction, effective in operation, and can be manufactured at a small cost.

Having thus described my invention, what I claim, and desire to secure by Letters Patent, is—

In a nut-lock, the combination of the bolt, the nut having a smooth inner face, the plate or bar provided with a retaining-notch, and the spring-washer consisting of a helically-coiled bar having its outer end pointed and turned slightly upward to bite against the inner face of the nut, and having its inner end bent at right angles and extended to form an arm, the end of which is bent at right angles to engage in a retaining-notch in the plate or bar, substantially as shown and described.

GIDEON WOODRING.

Witnesses:
C. E. BOSTWICK,
J. S. CARROLL.